(12) United States Patent
Morganson et al.

(10) Patent No.: US 12,157,272 B2
(45) Date of Patent: Dec. 3, 2024

(54) TWO-AXIS DEPOWDERING

(71) Applicant: Collins Engine Nozzles, Inc., West Des Moines, IA (US)

(72) Inventors: David W. Morganson, Marlborough, CT (US); Brendan T. Gustafson, East Hartford, CT (US); Tom Skiba, East Hartford, CT (US)

(73) Assignee: Collins Engine Nozzles, Inc., Des Moines, IA (US)

(*) Notice: Subject to any disclaimer, the term of this patent is extended or adjusted under 35 U.S.C. 154(b) by 887 days.

(21) Appl. No.: 17/221,460

(22) Filed: Apr. 2, 2021

(65) Prior Publication Data

US 2022/0314546 A1 Oct. 6, 2022

(51) Int. Cl.
| | |
|---|---|
| *B29C 64/00* | (2017.01) |
| *B08B 7/02* | (2006.01) |
| *B08B 13/00* | (2006.01) |
| *B29C 64/35* | (2017.01) |
| *B33Y 30/00* | (2015.01) |
| *B33Y 40/20* | (2020.01) |

(52) U.S. Cl.
CPC .............. *B29C 64/35* (2017.08); *B08B 7/028* (2013.01); *B08B 13/00* (2013.01); *B33Y 30/00* (2014.12); *B33Y 40/20* (2020.01)

(58) Field of Classification Search
CPC .......... B33Y 40/20; B08B 7/028; B08B 13/00
See application file for complete search history.

(56) References Cited

U.S. PATENT DOCUMENTS

| | | | |
|---|---|---|---|
| 2017/0036401 A1* | 2/2017 | Donovan | ................ B22F 10/20 |
| 2020/0376786 A1 | 12/2020 | Morganson et al. | |

FOREIGN PATENT DOCUMENTS

| | | |
|---|---|---|
| CN | 111113901 A | 5/2020 |
| CN | 112046004 A | 12/2020 |
| EP | 3257607 A1 | 12/2017 |
| EP | 3527304 A1 | 8/2019 |
| EP | 3536424 A1 | 9/2019 |

OTHER PUBLICATIONS

Extended European Search Report for European Patent Application No. EP22166031.9, dated Sep. 5, 2022.

* cited by examiner

*Primary Examiner* — Anshu Bhatia
(74) *Attorney, Agent, or Firm* — Kinney & Lange, P.A.

(57) ABSTRACT

A system for depowdering additively manufactured parts includes a deflection plate, a hammer device mounted to a first side of the deflection plate, and a mounting plate operatively connected to a second side of the deflection plate relative to the hammer device, the mounting plate being configured for rotation relative to the deflection plate.

19 Claims, 3 Drawing Sheets

TWO-AXIS DEPOWDERING

BACKGROUND

1. Field

The present disclosure relates to additive manufacturing, and more particularly to powder removal from parts after additive manufacturing processes that use stock powder such as laser powder bed fusion (LPBF) and the like.

2. Description of Related Art

Depowdering LPBF parts is a rate limiting part of the additive manufacturing process. Traditional commercial products and solutions fall short when applied to intricate parts. It remains important to have multiple tool options for depowdering to suit more and more geometries. Some of the traditional tools are effective, but there is an ongoing need for improvement and diversity of tools for depowdering additive manufactured parts.

The conventional techniques have been considered satisfactory for their intended purpose. However, there is an ever present need for improved systems and methods for enhanced depowdering. This disclosure provides a solution for this need.

SUMMARY

A system for depowdering additively manufactured parts includes a deflection plate, a hammer device mounted to a first side of the deflection plate, and a mounting plate operatively connected to a second side of the deflection plate relative to the hammer device, the mounting plate being configured for rotation relative to the deflection plate.

An ultrasonic transducer system can be mounted to the mounting plate for inducing ultrasonic vibrations into the mounting plate. The ultrasonic transducer system can include at least one ultrasonic transducer ring mount mounted to the mounting plate. Each ring mount can include a receptacle for mounting a respective ultrasonic transducer thereto. The ultrasonic transducers can be of an electrically insulative material and can be hardened against explosion for safe use with explosive powder. The at least one ultrasonic transducer ring mounts can be a pair of ultrasonic transducer ring mounts. A first ultrasonic transducer having a first frequency can be mounted to a first one of the ultrasonic transducer ring mounts, and a second ultrasonic transducer having a second frequency can be mounted to a second one of the ultrasonic transducer ring mounts. The first frequency of the first ultrasonic transducer can be different than the second frequency of the second ultrasonic transducer.

An arm can connect between an arm actuator and the deflection plate such that the arm actuator is configured to rotate the arm and deflection plate through 350° of rotation back and forth about an arm axis defined along the arm. A plate actuator can be connected to the deflection plate and to the mounting plate for actuating rotation of the mounting plate relative to the deflection plate within a plane parallel to a plane defined by the second surface of the deflection plate. The plate actuator can be configured to rotate the mounting plate through 80° of rotation back and forth about a plate axis perpendicular to the second surface of the deflection plate.

The mounting plate can include an inner hub and an outer rim connected to one another by a plurality of radial spokes. The rim of the mounting plate can include a plurality of sets of fastener holes configured to receive fasteners of a variety of different build plate configurations. The mounting plate can include a lip, wherein only the lip of the mounting plate contacts the deflection plate. A retention plate can be mounted to the deflection plate with a portion of the mounting plate between the deflection plate and retention plate.

A controller can be operatively connected to control movement of the mounting plate, and actuation of the hammer device and transducer system. The controller can include machine-readable instructions configured to cause the controller to rotate a build plate fixed to the mounting plate through yaw, pitch, and roll angles and to remove powder while doing so by controlling the hammer device to vibrate the build plate. The machine-readable instructions can include instructions to rotate a two axis system of actuators to rotate the mounting plate through yaw, pitch, and roll. The controller can be connected to the ultrasonic transducer system such that the machine-readable instructions can include instructions to drive ultrasonic vibrations from the ultrasonic transducer system into the build plate. The machine readable instructions can include instructions to sweep the ultrasonic transducer system through a range of resonant frequencies.

A build plate having an additively manufactured build can be mounted to the mounting plate with a plurality of fasteners. The fasteners can engage the mounting plate in part through a respective die spring for each fastener.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
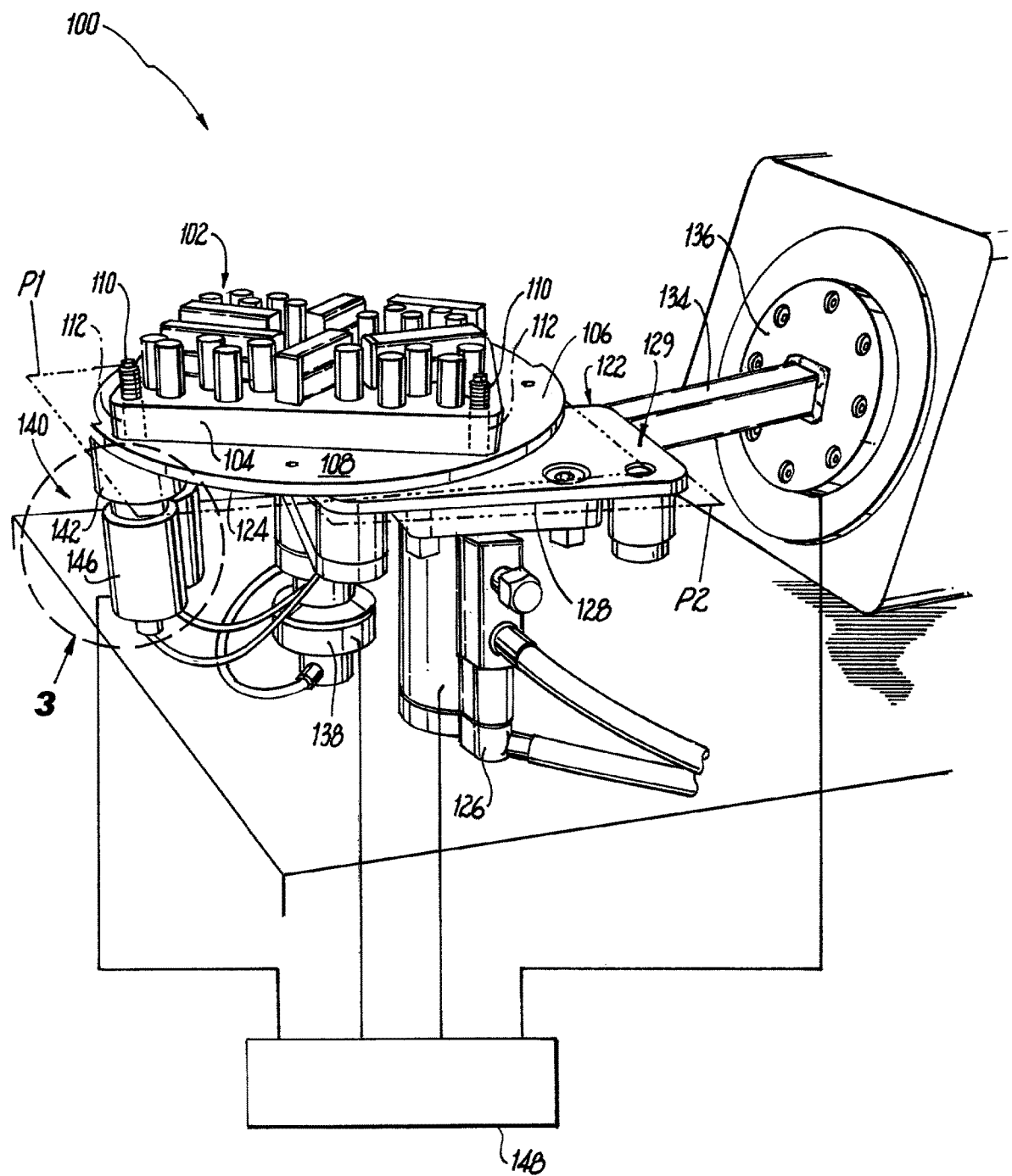
FIG. 1 is a schematic perspective view of an embodiment of an additive manufacturing system constructed in accordance with the present disclosure, showing a two-axis depowdering system with an additively manufactured part.
Figure 2:
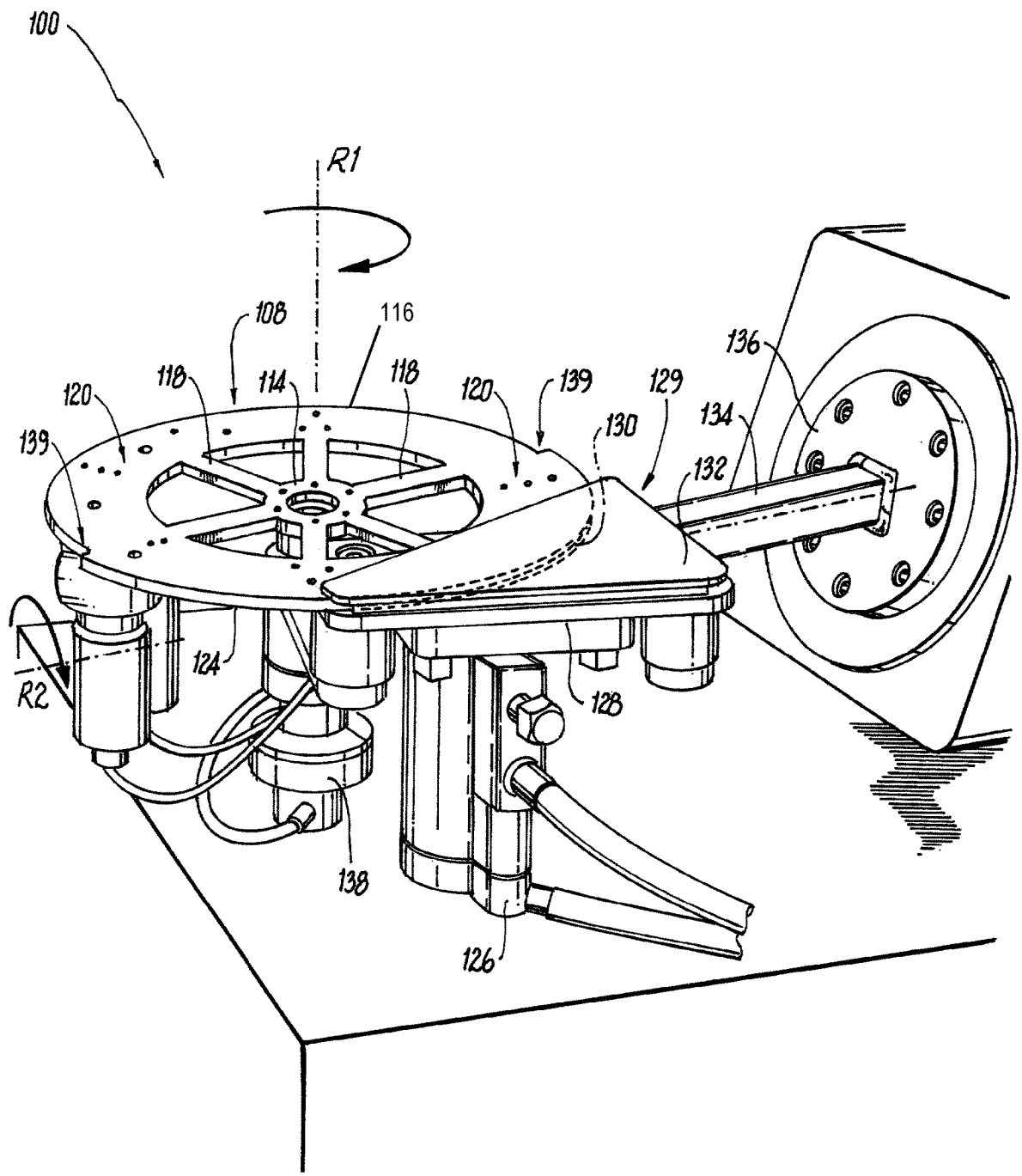
FIG. 2 is a schematic perspective view of an embodiment of the additive manufacturing system of FIG. 1 showing a two-axis depowdering system without an additively manufactured part.
Figure 3:
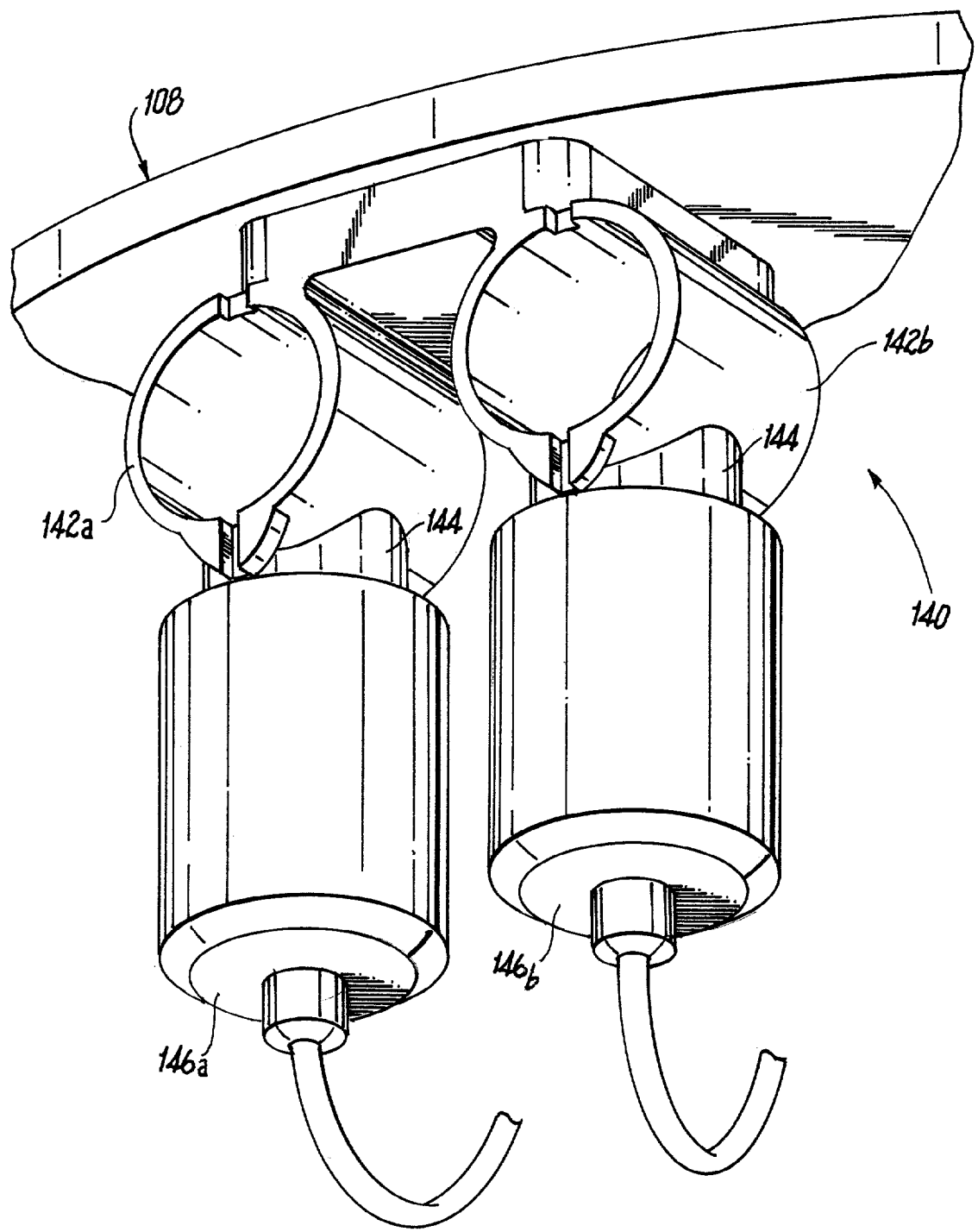
FIG. 3 is a schematic perspective view of an ultrasonic transducer system of the additive manufacturing system of FIG. 1.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to depowder additively manufactured parts.

After parts are additively manufactured, for example using a laser powder bed fusion method, or other powder sintering method, excess powder must be removed from the parts. To do so efficiently and safely, especially from internal features, can require applying directional and/or rotational forces to the additively manufactured parts. A system 100 for depowdering additively such manufactured parts 102 can include a build plate 104 mounted to a first side 106 of a mounting plate 108 with a plurality of fasteners 110 (e.g. bolts). The fasteners 110 can engage the mounting plate 108 in part through a respective die spring 112 for each fastener 110. Using die-springs 112 under heads of the fasteners 110 protects the fasteners 110 and allows for resonant bounce between build plate 104 and mounting plate 108.

The mounting plate 108 can include an inner hub 114 and an outer rim 116 connected to one another by a plurality of radial spokes 118. The spokes 118 allow for more deflection than would otherwise be possible with a solid mounting plate 108, and ultimately for improved resonance through the build plate 104 and par 102 for improved powder removal. The rim 116 of the mounting plate 108 can include a plurality of sets of fastener holes 120 configured to receive fasteners 110 of a variety of different build plate configurations. For example, the fastener holes 120 can be indexed (e.g. using lettering and/or numbering system) to correspond to known build plate configurations to assist in mounting and remounting the build plate 104 during cleaning. This can be beneficial if the system 100 is being implemented as a retrofit, for example.

A deflection plate 122 can be mounted to a second side 124 of the mounting plate 108 such that the mounting plate 108 can rotate to the deflection plate 122 about axis R1. A hammer device 126 (e.g. a pneumatic hammer) can be mounted to a first side 128 of the deflection plate 122, opposite the mounting plate 108. The deflection plate 122 can include a lip 130 for contacting the mounting plate 108 through actuation of the hammer device 126. In this way, only the lip 130 of the deflecting plate 122 contacts the mounting plate 108. The directional forces from the hammer device 126 are applied to the build plate through both the deflection plate 122 and the mounting plate 108, so as not to contact or cause damage to the build plate 104 or part 102. A retention plate 132 can be mounted to the deflection plate 122 (e.g. along a chordal major diameter) so that a portion of the mounting plate 108 is sandwiched between the deflection plate 122 and retention plate 132. The retention plate 132 thus provides additional support to the mounting plate 108, for example for heavier build plates 104 and/or parts 102.

An arm 134 can connect between an arm actuator 136 and the deflection plate 122 such that the arm actuator 136 is configured to rotate the arm 134 and deflection plate 122 together through 350° of rotation back and forth about an arm axis R2 defined along the length of the arm 134. A plate actuator 138 can be connected to the deflection plate 122 and to the mounting plate 108 for actuating rotation of the mounting plate 108 relative to the deflection plate 122 within a plane P1 parallel to a plane P2 defined by second side 129 of the deflection plate 122. The plate actuator 138 can be configured to rotate the mounting plate through 80° of rotation back and forth (e.g. between notches 139) about a plate axis R1 perpendicular to the second side 129 of the deflection plate 122, and perpendicular to the arm axis R2. The combined rotation of the arm 134 and the mounting plate 108 allow for two-axis rotation, changing force origin and resonance signature, provided a more effective powder removal.

An ultrasonic transducer system 140 can be mounted to the mounting plate 108 for inducing ultrasonic vibrations into the mounting plate 108, for example for multi-stage powder removal techniques and recipes. The ultrasonic transducer system can include at least one ultrasonic transducer ring mount 142 mounted to the mounting plate 108. Each ring mount 142 can include a receptacle 144 for mounting a respective ultrasonic transducer 146 thereto. Transducer ring mount 142 can allow the ultrasonic vibrations to clean the part 102, but will deflects when the hammer device 126 is actuated and applied to the mounting plate, protecting the transducer 146. For example, parametric adjustment of the present embodiment allows for the intended amplitude of energy transfer, while deflecting the hammer forces to reduce unintentional transfer of energy back to transducer component, which can be fragile and sensitive to the forces of the hammer device 126. The ultrasonic transducers 146 can be of an electrically insulative material protecting operators and surrounding equipment in event of transducer electrical fault, and can be hardened against explosion for safe use with explosive powder.

The at least one ultrasonic transducer ring mount 142 can be a pair of ultrasonic transducer ring mounts 142a,b, for example to mount multiple transducers 146 having the same or different frequencies. As shown, a first ultrasonic transducer 146a can be mounted to a first one of the ultrasonic transducer ring mounts 142a, and a second ultrasonic transducer 146b can be mounted to a second one of the ultrasonic transducer ring mounts 142b. The frequencies of the ultrasonic transducers can be the same or different, for example the first transducer 146a can have a frequency of 28 kHz, and the second transducer 146b can have a frequency of 40 kHz however any suitable transducer frequency can be used.

A controller 148 can be operatively connected to the system 100 to control movement of the mounting plate 108, and actuation of the hammer device 126 and transducer system 140. For example, the controller 148 can include machine-readable instructions configured to cause the controller to rotate the build plate through two axes of rotation, including yaw, pitch, and roll angles and to remove powder while doing so by controlling the hammer device to vibrate the build plate. The controller 148 can also be connected to the ultrasonic transducer system 140 to drive ultrasonic vibrations from the ultrasonic transducer system 140 into the build plate 104 through the mounting plate 108. The controller 148 can control the ultrasonic transducer system 140 to sweep through a range of resonant frequencies and amplitudes as needed for cleaning.

The methods and systems of the present disclosure, as described above and shown in the drawings, provide for improved depowdering without the need for manual blows applied directly to the build plate/and or finished part. Moreover, the system 100 can be incorporated into existing additive manufacturing systems that require inert environments for reactive powders. While the apparatus and methods of the subject disclosure have been shown and described, those skilled in the art will readily appreciate that changes and/or modifications may be made thereto without departing from the scope of the subject disclosure.

What is claimed is:
1. A system for depowdering additively manufactured parts, the system comprising:
a deflection plate;
a hammer device mounted to a first side of the deflection plate;

a mounting plate operatively connected to a second side of the deflection plate relative to the hammer device, the mounting plate being configured for rotation relative to the deflection plate; and a retention plate mounted to the deflection plate with a portion of the mounting plate between the deflection plate and retention plate.

2. The system as recited in claim 1, further comprising an ultrasonic transducer system mounted to the mounting plate for inducing ultrasonic vibrations into the mounting plate.

3. The system as recited in claim 2, wherein the ultrasonic transducer system includes at least one ultrasonic transducer ring mount mounted to the mounting plate, wherein each ring mount includes a receptacle for mounting a respective ultrasonic transducer thereto.

4. The system as recited in claim 3, wherein the at least one ultrasonic transducer ring mounts is a pair of ultrasonic transducer ring mounts, wherein a first ultrasonic transducer having a first frequency is mounted to a first one of the ultrasonic transducer ring mounts, and a second ultrasonic transducer having a second frequency is mounted to a second one of the ultrasonic transducer ring mounts.

5. The system as recited in claim 4, wherein the first frequency of the first ultrasonic transducer is different than the second frequency of the second ultrasonic transducer.

6. The system as recited in claim 4, wherein the ultrasonic transducers are hardened against explosion for safe use with explosive powder.

7. The system as recited in claim 2, further comprising a controller operatively connected to control movement of the mounting plate and actuation of the hammer device and ultrasonic transducer system, wherein the controller includes machine-readable instructions configured to cause the controller to rotate a build plate fixed to the mounting plate through yaw, pitch, and roll angles and to remove powder while doing so by controlling the hammer device and ultrasonic transducer system to vibrate the build plate.

8. The system as recited in claim 7, wherein the machine-readable instructions include instructions to rotate a two axis system of actuators to rotate the mounting plate through yaw, pitch, and roll.

9. The system as recited in claim 7, wherein the controller is connected to an ultrasonic transducer system, and wherein the machine-readable instructions include instructions to drive ultrasonic vibrations from the ultrasonic transducer system into the build plate.

10. The system as recited in claim 9, wherein the machine readable instructions include instructions to sweep the ultrasonic transducer system through a range of resonant frequencies.

11. The system as recited in claim 1, further comprising an arm connecting between an arm actuator and the deflection plate.

12. The system as recited in claim 11, wherein the arm actuator is configured to rotate the arm and deflection plate through 350° of rotation back and forth about an arm axis defined along the arm.

13. The system as recited in claim 1, further comprising a plate actuator connected to the deflection plate and to the mounting plate for actuating rotation of the mounting plate relative to the deflection plate.

14. The system as recited in claim 13, wherein the plate actuator is connected to the deflection plate and to the mounting plate to rotate the mounting plate within a plane parallel to a plane defined by the second surface of the deflection plate.

15. The system as recited in claim 14, wherein the plate actuator is configured to rotate the mounting plate through 80° of rotation back and forth about a plate axis perpendicular to the second surface of the deflection plate.

16. The system as recited in claim 1, wherein the mounting plate includes an inner hub and an outer rim connected to one another by a plurality of radial spokes.

17. The system as recited in claim 16, wherein the rim of the mounting plate includes a plurality of sets of fastener holes configured to receive fasteners of a variety of different build plate configurations.

18. The system as recited in claim 1, wherein the deflection plate includes a lip, wherein only the lip of the deflection plate contacts the mounting plate.

19. The system as recited in claim 1, further comprising a build plate including an additively manufactured build, wherein the build plate is mounted to the mounting plate with a plurality of fasteners, wherein the fasteners engage the mounting plate in part through a respective die spring for each fastener.

* * * * *